United States Patent
Maikish et al.

[11] 3,793,700
[45] Feb. 26, 1974

[54] METHOD OF RESHAPING METAL MATRIX COMPOSITE MATERIAL

[75] Inventors: Charles R. Maikish; Herman R. Wiant, both of Cajon, Calif.

[73] Assignee: General Dynamics Corporation, San Diego, Calif.

[22] Filed: Sept. 1, 1972

[21] Appl. No.: 285,684

[52] U.S. Cl. ........................ 29/419, 29/480, 29/481, 29/475, 72/47
[51] Int. Cl. ............................................ B23p 17/00
[58] Field of Search .. 29/480, 481, 472.3, 475, 419, 29/424; 72/47

[56] References Cited
UNITED STATES PATENTS

| | | | |
|---|---|---|---|
| 3,378,916 | 4/1968 | Robinson | 29/419 X |
| 3,606,667 | 9/1971 | Kreider | 29/423 |
| 3,667,108 | 6/1972 | Schmidt | 29/480 |

*Primary Examiner*—Richard B. Lazarus
*Attorney, Agent, or Firm*—John R. Duncan; Hugo F. Mohrlock

[57] ABSTRACT

A method of reshaping high strength fiber reinforced metal composite sheets is disclosed. The sheets, which typically comprise unidirectionally oriented boron fibers in an aluminum matrix are metallurgically bonded to a pair of thin ductile metal face sheets. The resulting composite is then reshaped as desired by bending the composite along lines parallel to the fiber direction. Finally, the face sheets are removed, such as by acid etching, except in those areas in which it is desired to retain portions of the overlayer. Among other advantages, this technique permits much sharper radius bends by much simpler techniques that those previously used with such composite materials.

6 Claims, 5 Drawing Figures

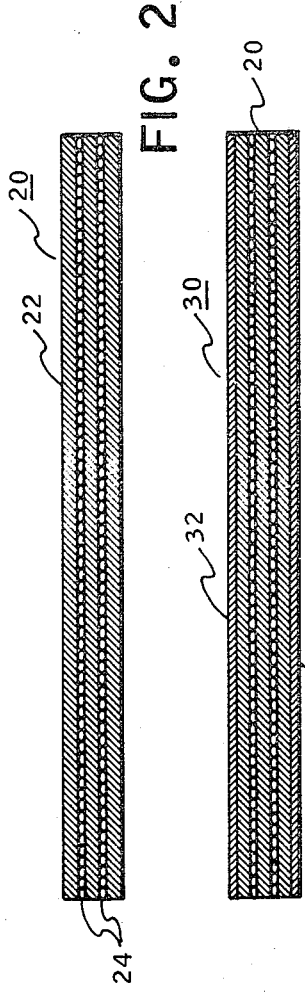
FIG. 2
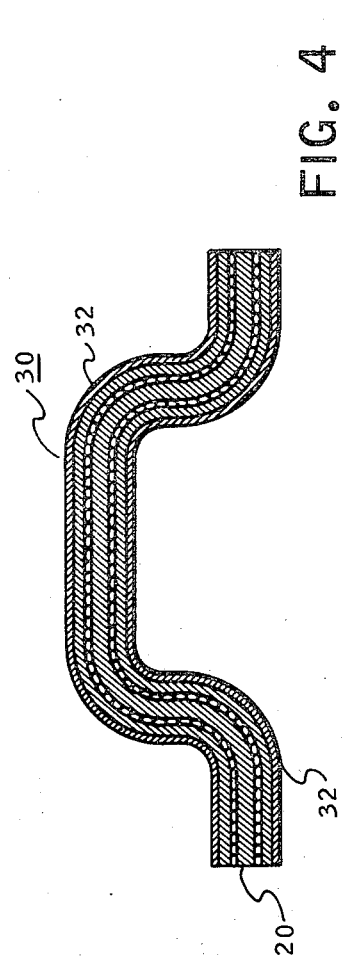
FIG. 3
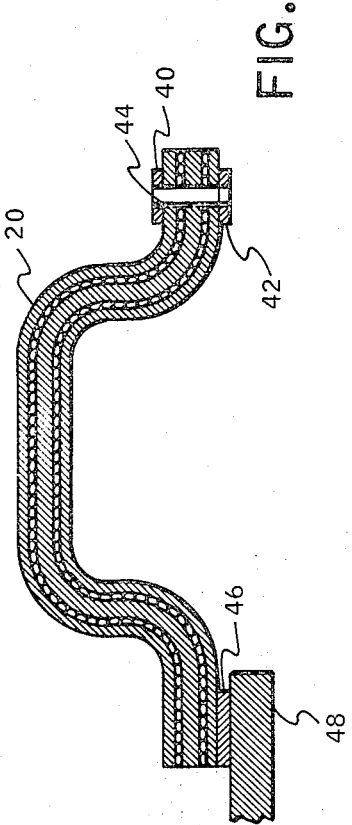
FIG. 4
FIG. 5
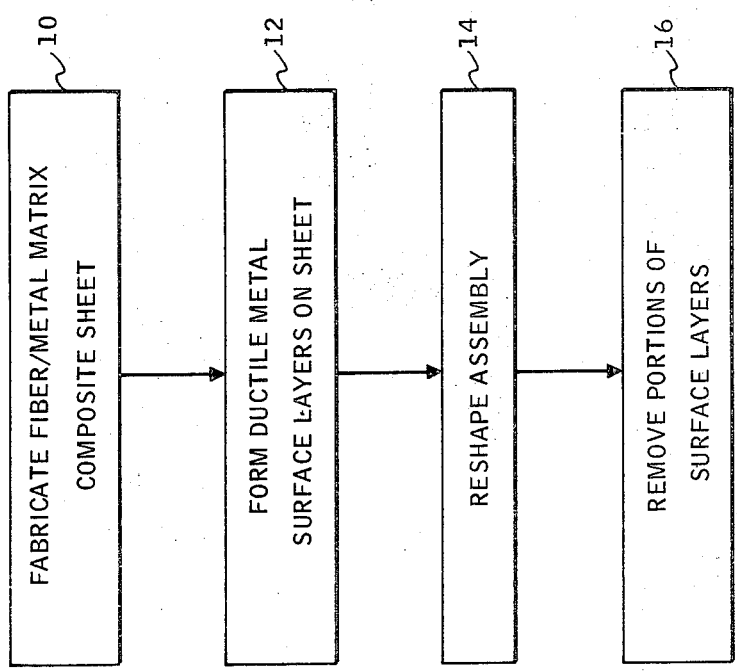
FIG. 1

3,793,700

METHOD OF RESHAPING METAL MATRIX COMPOSITE MATERIAL

BACKGROUND OF THE INVENTION

Recently, much interest has developed in high strength, light weight structural shapes made from composite materials which utilize very high strength fibers or filaments embedded in a metal matrix.

Typical composite materials comprise a plurality of substantially parallel boron fibers in an aluminum matrix. These materials have very high strength properties in the fiber direction combined with relatively low weight. These properties are especially desirable in a number of aerospace applications.

Unfortunately, these materials are very difficult to reshape by conventional metalworking processes. Bending composite sheet materials along a line perpendicular to the fibers is very difficult because the fibers are so stiff they fracture rather than bend. Bending the composite along lines parallel to the fibers is also difficult since the material has a low transverse strength and the metal matrix tends to rupture at the bend.

Many structural shapes, such as columns, channels, "T", and "hat" sections, effectively utilize the great unidirectional strength of composite materials. Forming these shapes generally requires narrow-radius bends parallel to the fiber direction. While several techniques for making these bends have been developed, none is entirely satisfactory. Preform sheets have been made with fiber density lower in the bend region so that the composite is more ductile in these areas. However, this reduces sheet strength in those areas and requires careful hand lay-up of the preform sheet. Generally, only sheets 0.03 inch thick and thinner can be formed without fiber damage and matrix cracking, and then only when hot-formed to radii of 6 times sheet thickness and larger.

Since the composite materials are relatively stiff and springy, it is difficult to obtain accurate bends in one step. To eliminate springback and obtain accurate size and shape, the sheet must be first bent to the approximate final shape, then hot sized.

In fabricating structures from such composite materials problems are often encountered in bonding the composite sheets to other structures. Direct bonding, such as by soldering, brazing or welding, of the aluminum composite matrix to other materials, such as steel or titanium is often difficult. Similarly, fastening composite shapes to other structures by means of bolts or rivets is difficult due to the low strength of composites transverse to the fiber direction. Splitting of the composite material at rivet holes is common.

Thus, there is a continuing need for improved methods of fabricating structural shapes from composite materials made up of high strength fibers in a metal matrix.

SUMMARY OF THE INVENTION

It is, therefore, an object of this invention to provide a process for reshaping metal matrix composite materials which overcomes the above noted problems.

Another object of this invention is to provide a method for reshaping metal matrix composite materials useful at both room and elevated temperatures.

Still another object of this invention is to provide a technique for forming high quality small radius bends in metal matrix composite sheet materials.

Yet another object of this invention is to provide a method of selectively reinforcing areas on formed metal matrix composite materials.

The above objects, and others, are accomplished in accordance with this invention by a process for reshaping composite sheets in which high strength fibers are substantially unidirectionally embedded in a metal matrix, which comprises forming a homogenous layer of ductile metal on each surface of the composite sheet, bending the assembly as desired along lines which are substantially parallel to the fibers, then removing the surface metal layers from desired areas.

BRIEF DESCRIPTION OF THE DRAWING

Details of the invention will be further understood upon reference to the drawing wherein:

FIG. 1 is a flow sheet illustrating the steps in the process of this invention;

FIG. 2 is a schematic cross-section through a composite sheet corresponding to the first step of FIG. 1;

FIG. 3 is a schematic cross-section through a composite assembly corresponding to the second step of FIG. 1;

FIG. 4 is a schematic cross-section through a formed composite assembly corresponding to the third step of FIG. 1; and FIG. 5 is a schematic cross-section through a final formed composite corresponding to the fourth step of FIG. 1.

DETAILED DESCRIPTION OF THE DRAWING

Referring now to FIG. 1, there is seen a flow sheet for the process of this invention. Basically, the process begins with a first step, as indicated in box 10, of fabricating a sheet of composite material comprising high strength fibers unidirectionally oriented in a metal matrix.

Any suitable high strength fibers may be used. Typical fibers include boron fibers formed by depositing boron onto a very thin tungsten wire, boron fibers having a thin surface coating of silicon carbide (available from Hamilton-Standard under the trademark "Borsic"), silicon carbide fibers, nitride coated high modulus fibers and mixtures thereof. Typical fibers have diameters from about 0.0040 to 0.0057 inch, tensile strength greater than about 400,000 psi and tensile modulus of elasticity of at least about $55 \times 10^6$ psi. While any suitable fiber arrangement may be used, a parallel closely-spaced arrangement is preferred with about 150 to 200 fibers per inch width and with fiber content in the composite sheet of about 50 percent by weight. In general boron fibers are preferred because of their excellent physical characteristics.

Any suitable metal may be used for the fiber-embedding matrix. Typical metals include aluminum, titanium, copper and alloys thereof. In general best results, with the optimum combination of high strength, good formability and low weight are obtained with aluminum as the matrix material. Typical preferred alloys include 2024 and 6061 aluminum.

The composite fiber-metal matrix sheets may be prepared by any suitable process. Typically, a metal foil may be placed around a large drum, fibers may be wrapped in a contiguous substantially parallel array, then an adhesive may be sprayed over the fibers or a layer of aluminum may be plasma sprayed over the fibers to bond them to the foil. A plurality of these fiber-foil sheets, with or without interleaved sheets of foil, may be stacked and bonded together, such as by diffusion bonding, under heat and pressure.

The end result of the first step, as indicated in box 10 of FIG. 1, is a composite sheet having a plurality of parallel high strength fibers in a metal matrix. A cross-sectional view through this composite taken perpendicular to the fibers is shown in FIG. 2. Preform 20 comprises a metal matrix 22 in which fibers 24 are embedded. Preform 20 may have any suitable dimensions. Generally, best results are obtained where preform 20 has a thickness of about 0.020 to 0.10 inch.

The second step of the process of this invention, as illustrated in box 12 of the FIG. 1 flow sheet, comprises forming surface layers of a ductile metal on each surface of preform 20, at least in those areas which are to be bent or otherwise deformed. The resulting assembly 30 is illustrated in section in FIG. 3. If desired, a number of composite fiber-containing sheets can be stacked with a ductile metal sheet at the top and bottom, and the entire assembly can be bonded together in one step.

Any suitable metal may be used in surface layers 32. Typical metals include mild steel, stainless steel, nickel, titanium and alloys thereof. Ductile low carbon steel is generally preferred, since it produces excellent bends when used in this process and may be easily removed without damage to the composite. Steel is also especially advantageous when selected areas are not to be removed, but are left bonded to the composite as reinforcements, fastening and bonding pads, etc.

The ductile metal surface layer may have any suitable thickness. The thickness of layers 32 bears some relationship to the materials used and to the thickness of composite sheet 20. Generally, layers 32 should be thicker where formed from softer, more ductile metals or alloys. Also, thinner surface layers 32 can generally be used with thinner composite sheets 20. Typically, mild steel surface layers used on 0.02 to 0.05 inch thick composite sheets comprising boron fibers in an aluminum matrix may have thicknesses ranging from about 0.015 to 0.025 inch.

Surface layers 32 may be formed by any suitable method. Typical methods include metallurigical bonding of preformed sheets, such as by diffusion bonding; electroplating electroless plating, brazing, welding, etc. Metallurgical bonding of preformed sheets is preferred since it can be done rapidly and economically.

Once surface layers 32 are applied, the assembly 30 is reshaped as indicated in the third step illustrated in FIG. 1 (box 14). A typical hat section is shown in FIG. 4, produced by four bending operations. Any shape which primarily requires bending around lines parallel to the fiber orientation, such as angles, channels, "Z" sections, etc., may be conveniently formed by this process. Much tighter radius bends may be formed by this process than is possible without surface layers 32. In the past, even with heating the composite to 800°F, crackling and wrinkling of the composite sheet generally occurred if bends tighter than seven time the composite sheet thickness were attempted. With the present process, bends as tight as three times the sheet thickness can be obtained at room temperature with composite sheets of about 0.030 inch thickness. While wider bends may be necessary with thicker composite sheets, the bend radius can be improved by heating the material. In any event, much narrower radius bends can be obtained by this process under a given set of conditions than was possible without surface layers 32. Furthermore, normal sheet metal working tools may generally be used to form the assembly 30, since it tends to bend along lines parallel to the fiber orientation much like a similarly dimensional sheet of mild steel. Without surface layers 32, composite sheets required complex tooling and careful handling to obtain acceptable bends. The assembly 30 also has less "springback" than does the basic composite sheet 20, so that bends to a final selected angle can be accomplished in one step, instead of the previously required separate rough forming and final sizing steps.

While surface layers 32 may be applied to composite 20 only in the bend regions, generally for simplicity and uniformity it is preferred to completely cover composite 20 with the surface layers.

The final step in this process, as illustrated in box 16 of FIG. 1, is the removal of surface layers 32, at least from selected areas. FIG. 5 illustrates a hat section from which surface layers 32 have been removed except from areas 40, 42, and 44.

As seen in FIG. 5, portions of surface layer 32 may be left in place if desired. For example, if a rivet or other fastener is to be secured to the composite, circular areas 40 and 42 may be left. These areas will then serve as bearing surfaces and reinforcements when a hole 44 is drilled out for the fastener. Similarly, a bonding pad 46 may be left where it is desired to secure a member 48 to the composite structure. Thus, where the metal matrix is aluminum, surface layer 32 and pad 46 may be mild steel, so that sheet 48, which may be steel, can be more easily bonded by conventional brazing or welding. Also, since composite materials have highly unidirectional strength characteristics, portions of layer 32 may be left in selected areas to increase the strength of those areas transverse to the fiber direction.

The portions of surface layers 32 to be removed may be removed by any suitable process. Typically, surface layers 32 may be dissolved by a solvent or etching solution which does not attack the composite, or they may be mechanically removed by grinding or machining. Chemical etching is preferred, since it is rapid, efficient, and does not damage the composite. Areas to be left, such as areas 40, 42 and 46 in FIG. 5, may be retained by merely coating them with a material resistant to the etchant, then removing the resist coating after etching is complete.

The following examples describe in detail several preferred embodiments of the process of this invention. Parts and percentages are by weight unless otherwise indicated.

EXAMPLE I

Two packs, each comprising six layers of boron/aluminum sheets, available from the Hamilton-Standard Division of United Aircraft, are prepared. Each sheet consists of an aluminum foil having a surface layer of parallel contiguour Borsic (silicon carbide coated boron) fibers bonded to the foil by plasma-sprayed aluminum. Each sheet has an uncompacted thickness of about 0.009 inch.

The packs are assembled by stacking the sheets with all fibers unidirectionally oriented and two outer layers of 0.0014 inch 6061 aluminum foil. The outer surfaces of the first pack are coated with Nicrobraze-red, a stopbond material, and two steel caul plates are placed above and below the pack. The outer surfaces of the second pack are wire brushed and thoroughly cleaned with acetone. Two 0.014 inch fully annealed mild steel sheets are also cleaned and placed above and below the second pack. Each pack is then diffusion bonded in a high pressure autoclave at about 10,000 psi and 900°F for about 60 minutes. Pressure is then lowered to about 3,500 psi, the temperature is raised to about 975°F. After about 15 minutes, the autoclave is cooled and depressurized. The first bonded composite sheet has a compacted thickness of about 0.033 inch and the second bonded composite sheet about 0.061 inch (due to the bonded steel surface plates). Each sheet is then bent on conventional production metal working equipment into hat sections such as is shown in FIGS. 4 and 5 of the drawing. Bend radius is about three times thickness, or about one-eighth inch. The second composite sheet is then immersed in a 50 percent solution of nitric acid. The mild steel surface layers are rapidly etched away without damage to the boron/aluminum composite. Visual and radiographic examination of the second composite sheet shows bends of excellent quality, with substantially no cracking of the aluminum matrix or damage to the boron fibers. Examination of the first composite sheet shows severe cracking of the aluminum matrix at the bends with fracturing and distortion of fibers near the surface.

Example II

Ten boron/aluminum sheets, each consisting of a single collinated contiguous layer of boron fibers diffusion bonded between two 6061 aluminum foils are stacked with the fibers unidirectionally oriented. Each sheet has an uncompacted thickness of about 0.007 inch. The outer surfaces of the stack are carefully cleaned and two sheets of 0.2 carefully cleaned mild steel are placed thereagainst. The resulting pack is placed in a high pressure autoclave and diffusion bonded at 10,000 psi and 900°F for about three hours. After cooling and prepressurization, the pack is removed from the autoclave. The resulting composite plate has a compacted thickness of about 0.110 inch. Using conventional sheet metal forming tooling such as would be used to bend a plain steel plate of equal thickness, the composite plate is bent parallel to the fiber direction to a radius of about 0.2 inch. Selected areas on the plate are then treated with Turcoform Maskant 538 (Turco Corp.), an acid resistant material. Typically, circular areas on opposite sides of the sheet are treated, as is a generally rectangular area on one surface. The plate is then placed in a 50 percent nitric acid solution to etch away the steel surfaces except where protected by the coating. After rinsing the plate in water, the resist coating are peeled off. Rivet-receiving holes are drilled through the remaining circular steel layer areas and in some bare composite areas. Steel straps are then riveted to the plate through these holes. Shear stress is then applied to the rivets. Where the rivets pass through the steel surface layers, the composite is found to have much higher strength than where the rivets pass through the unprotected boron/aluminum composite. The unprotected composite is seen to tear easily in a direction parallel to the fibers. Another steel strap is brazed to the rectangular steel surface area by conventional steel-to-steel techniques, illustrating the ease with which conventional structural materials may be bonded to this composite configuration.

Example III

Six sheets each consisting of a parallel contiguous array of Borsic fibers bonded to the surface of an aluminum foil are stacked with fiber-bearing surfaces uppermost. A 0.014 inch aluminum foil is added to the stack, then six more Borsic fiber/aluminum foil sheets are added with the fiber-bearing surfaces downward. Finally, two 0.01 titanium sheets are placed over the outside of the stack. The resulting composite pack is coated with Nicrobraze-red stop-off material, placed between caul plates. The pack is heated to about 950°F and maintained under about 10,000 psi pressure for about 2 hours. After pressure is removed and the resulting compacted composite plate is cooled to room temperature the stop-off material is removed and the outer surfaces of the plate are thoroughly cleaned. The composite plate is then overcoated with a 0.01 inch copper layer by conventional electroplating techniques. The assembly is then bent along lines parallel to the fiber direction by conventional sheet metal bending equipment to form a Z section. The copper surface layers are removed by nitric acid etching. The resulting composite shape has bends of excellent quality, with no evidence of matrix fiber damage.

While specific conditions, proportions and arrangement have been described in the above examples of preferred embodiments, these may be varied, as discussed above, with similar results. Other modifications, applications and ramifications of the invention will become apparent to those skilled in the art upon reading this disclosure. These are intended to be included within the scope of this invention as defined in the appended claims.

We claim:

1. A method of shaping high strength fiber reinforced metal composite sheets which comprises:
   providing a composite sheet in which high strength fibers are unidirectionally arrayed in a metal matrix,
   metallurigically bonding a sheet of ductile metal having substantially uniform strength characteristics in all directions to each major surface of said composite sheet to form a sandwich structure,
   bending said sheet as desired about lines which are substantially parallel to said fiber direction; and
   removing at least portions of said ductile metal sheets from said composite sheet.

2. The method according to claim 1 wherein said composite sheet comprises high strength fibers comprising boron embedded in an aluminum matrix.

3. The method according to claim 2 wherein said ductile metal sheets comprise mild steel sheets diffusion bonded to said composite sheet.

4. The method according to claim 3 wherein said ductile metal sheets are at least partially removed by treating selected areas with nitric acid.

5. The method according to claim 4 where said composite sheet has a thickness of from about 0.02 to 0.05 inch, said ductile metal sheets have thicknesses of from about 0.015 to 0.025 inch and said sheet is bent to a radius as narrow as three times the thickness of the composite sheet.

6. A method of reshaping high strength fiber reinforced metal composite sheets which comprises:
   providing a composite sheet comprising high strength boron fibers substantially unidirectionally arrayed in an aluminum matrix;
   metallurigically bonding a thin mild steel cover sheet to each face of said composite sheet to form a unitary sandwich structure;
   reshaping said sheet by bending said sandwich as desired about lines which are substantially parallel to said fibers; and
   treating at least portions of said sandwich with nitric acid to dissolve away the treated portions.

* * * * *